(12) United States Patent
Asao

(10) Patent No.: US 6,498,414 B2
(45) Date of Patent: Dec. 24, 2002

(54) STATOR OF DYNAMO-ELECTRIC MACHINE

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/802,896

(22) Filed: Mar. 12, 2001

(65) Prior Publication Data

US 2002/0024266 A1 Feb. 28, 2002

(30) Foreign Application Priority Data

Aug. 29, 2000 (JP) .................................... 2000-259299

(51) Int. Cl.[7] .............................. H02K 3/00; H02K 3/04
(52) U.S. Cl. ...................... 310/184; 310/179; 310/180; 310/201; 310/45
(58) Field of Search ................................ 310/179, 180, 310/184, 195, 201, 45

(56) References Cited

U.S. PATENT DOCUMENTS 1,826,295 A * 10/1931 Apple .......................... 310/201
4,833,356 A * 5/1989 Bansal et al. ................ 310/180
5,982,068 A * 11/1999 Umeda et al. ............... 310/206
5,986,375 A * 11/1999 Umeda et al. ............... 310/180
6,222,295 B1 * 4/2001 Umeda et al. ............... 310/179

FOREIGN PATENT DOCUMENTS

| EP | 1 128 527 A1 | 8/2001 | |
|---|---|---|---|
| EP | 1 179 880 A2 | 2/2002 | |
| JP | 11-164506 | 6/1999 | ............ H02K/3/50 |
| JP | 2000-166150 | 6/2000 | ............ H02K/3/04 |

* cited by examiner

Primary Examiner—Burton S. Mullins
(74) Attorney, Agent, or Firm—Sughrue Mion, PLLC

(57) ABSTRACT

A stator of a dynamo-electric machine suppresses short-circuiting attributable to joint portions so as to provide good insulating properties. In a front coil-end group, a turn portion of a first conductor segment and a joint portion of end portions of a second conductor segment are adjacently aligned in a single row in a radial direction, being arrayed in two rows in a circumferential direction. In a rear coil-end group, a joint portion of the end portions of the first conductor segment and the turn portions of the second conductor segment are adjacently arranged in a single row in the radial direction, being arrayed in two rows in the circumferential direction.

16 Claims, 10 Drawing Sheets

STATOR OF DYNAMO-ELECTRIC MACHINE

This application is based on Application No. 2000-259299, filed in Japan on Aug. 29, 2000, the contents of which are hereby incorporated by reference.

BACKGROUND OF THE INVENTION

1. Field of the Invention

The present invention relates to a stator of a dynamo-electric machine and, more particularly, to a structure of a stator of an alternator driven by an internal combustion engine, such as a structure of a stator of an automotive alternator that can be mounted on a passenger car, a truck, or the like.

2. Description of the Related Art

FIG. 15 is a schematic perspective view showing conductor segments which are constituents of a stator winding in a stator of a conventional automotive alternator disclosed in, for example, Japanese Unexamined Patent Publication No. 11-164506. FIG. 16 is a simplified view showing coil-end groups in the conventional stator of the automotive alternator shown in FIG. 15, and FIG. 17 is a simplified view illustrating the layout of joint portions of the coil-end group in the conventional stator of the automotive alternator shown in FIG. 15.

Referring to FIG. 15, a first conductor segment 331 is formed by bending a copper constituent that is covered with an insulating film and has a rectangular cross section. The first conductor segment 331 is substantially formed into a U shape by connecting a pair of straight portions 331a and 331b at a turn portion 331c. A second conductor segment 332 is formed by bending a copper constituent that is covered with an insulating film and has a rectangular cross section. The second conductor segment 332 is also substantially formed into a U shape by connecting a pair of straight portions 332a and 332b at a turn portion 332c.

In a conventional stator 100, a pair of the first conductor segment 331 and the second conductor segment 332 constructed as set forth above is inserted into a pair of slots of a stator iron core 101 from one end of a the stator iron core, the slots being spaced apart from each other by one magnetic pole pitch. Four straight portions 331a, 332a, 332b, and 331b are accommodated in each slot such that they are aligned in one row in the radial direction or the direction of slot depth. For the convenience of explanation, the positions of the straight portions aligned in each slot will be referred to as a first address, a second address, a third address, and a fourth address, the first address indicating the innermost position. As shown in FIG. 15, an end portion 331d of the first conductor segment 331 extending out from the first address of one slot to the other end of the stator iron core 101 is joined by welding to, for example, an end portion 332d of the second conductor segment 332 extending out from the second address of another slot to the other end of the stator iron core 101, the slot being spaced apart clockwise from the above slot by one magnetic pole pitch. Furthermore, an end portion 332e of the second conductor segment 332 extending out from the third address of one slot to the other end of the stator iron core 101 is joined by welding to, for example, an end portion 331e of the first conductor segment 331 extending out from the fourth address of another slot to the other end of the stator iron core 101, the slot being spaced apart clockwise from the above slot by one magnetic pole pitch. Thus, a lap-wound winding having four turns for each phase is formed. Furthermore, the lap-wound windings for three phases are ac-connected to make up a stator winding 102.

In the stator 100 configured as described above, a coil-end group 102a of the stator winding 102 at one end of the stator iron core 101 is constituted by the first conductor segments 331 and the second conductor segments 332 arranged in two layers in the circumferential direction such that the turn portions 331c of the first conductor segments 331 surround the turn portions 332c of the second conductor segments 332 in an axial direction, as shown in FIG. 16 and FIG. 17. A coil-end group 102b of the stator winding 102 at the other end of the stator iron core is constituted by a joint portion 334a of the end portions 331d and 332d and a joint portion 334b of the end portions 331e and 332e arranged adjacently in two layers in one row in the radial direction, being arrayed in two rows in the circumferential direction, the joint portions 334a and 334b being flush in the axial direction.

However, in the coil-end group 102b of the stator winding 102 of the conventional stator 100, the joint portions 334a and 334b are aligned in two layers adjacently in a single row in the radial direction, being arranged in two rows in the circumferential direction, and the heights of the joint portions 334a and 334b being the same in the axial direction. Hence, the radial interval between the joint portions 334a and 334b from which the insulating film has been lost due to welding is small, presenting a problem of proneness to short-circuiting. There has been another problem in that the joint portions 334a and 334b that are adjacent to each other in the radial direction and have the same height in the axial direction make it difficult to weld them, adversely affecting welding efficiency.

To solve the above problems, an improvement in which the joint portions 334a and 334b are arranged by shifting them in the circumferential direction has been proposed in, for example, Japanese Unexamined Patent Publication No. 2000-166150.

FIG. 18 is a schematic perspective view showing conductor segments of a stator winding in a stator of an improved conventional automotive alternator disclosed in, for example, Japanese Unexamined Patent Publication No. 2000-166150. FIG. 19 is a development partial side view, observed from an inner diameter side, of the stator of the conventional automotive alternator shown in FIG. 18. FIG. 20 is a simplified view illustrating the layout of joint portions in a coil-end group in the stator of the conventional automotive alternator shown in FIG. 18.

In an improved stator 100A, when welding end portions 331d, 332d, 331e, and 332e, the end portions of a first conductor segment 331 and a second conductor segment 332 extending out to the other end of a stator iron core 101 are tilted at different angles so as to cause joint portions 334a and 334b to be shifted in a circumferential direction by "w," as shown in FIG. 18 and FIG. 19.

With this arrangement, a coil-end group 102b of the stator winding 102 at the other end of the stator iron core 101 is configured such that the joint portions 334a and 334b have the same axial height, and are shifted by "w" in the circumferential direction and arranged in two rows in the circumferential direction, as shown in FIG. 20.

The stator 100A shares the same construction as that of the stator 100 except that the joint portions 334a and 334b are shifted by "w" in the circumferential direction.

Another conventional stator structure employing first, second, and third conductor segments 331, 332, and 333 has been disclosed in, for example, Japanese Unexamined Patent Publication No. 2000-166150. In a stator 100B shown in FIGS. 21 and 22, a coil-end group 102a of a stator winding 102 is constituted by turn portions 331c, 332c, and 333c arranged in the circumferential direction in three layers in the axial direction. A coil-end group 101b is constituted by joint portions 334a, 334b, and 334c which share the same axial height and are arranged in three rows in the circumferential direction so that they are shifted in the circumferential direction by "w".

In the stators 100A and 100B constructed as set forth above, the intervals between the joint portions are longer since the joint portions are shifted in the circumferential direction. This arrangement is expected to suppress the occurrence of short-circuiting between the joint portions that have lost an insulating film due to welding, and also to improve welding efficiency.

According to the stator 100 of the conventional automotive alternator 100, in the coil-end group 102b of the stator winding 102, the joint portions 334a and 334b share the same axial height and adjacently aligned in two layers in one row in the radial direction, being arrayed in two rows in the circumferential direction. This arrangement has been presenting a shortcoming in that the radial interval between the joint portions 334a and 334b that have lost the insulating film due to welding is short, frequently causing short-circuiting. There has been another shortcoming in that the joint portions 334a and 334b, which have the same height in the axial direction and are adjacent to each other in the radial direction, make it difficult to weld them, resulting in poor welding efficiency.

According to the stators 100A and 100B of the conventional automotive alternator, the joint portions 333a and 333b, or the joint portions 333a, 333b, and 333c, have the same height in the axial direction and are arranged in two or three rows in the circumferential direction so that they are shifted by "w" in the circumferential direction. With this arrangement, greater intervals can be allowed between the joint portions, so that the chance of short-circuiting between the joint portions can be minimized, permitting improved welding efficiency to be achieved.

However, in the stators 100, 100A, or 100B of the conventional automotive alternator stator, the coil-end group 102b is constructed by joint portions that have the same height in the axial direction and are arranged in two or three rows in the circumferential direction. This arrangement has been posing a problem in that the joint portions may be short-circuited from vibrations, leading to deterioration of insulating properties.

Furthermore, since the joint portions are configured to have the same height in the axial direction, as the number of rows in the circumferential direction increases, the joint portions are more prone to short-circuiting, and weldability deteriorates, making the construction disadvantageous in adding more rows.

SUMMARY OF THE INVENTION

Accordingly, the present invention has been made with a view toward solving the above problems, and it is an object of the present invention to provide a stator of a dynamo-electric machine in which joint portions of strands of wire are disposed adjacently to turn portions in a radial direction so as to eliminates the possibility of short-circuiting attributable to the joint portions, thereby allowing improved insulating properties to be achieved.

It is another object of the present invention to provide a stator of a dynamo-electric machine in which joint portions of strands of wire are disposed adjacently to turn portions or other joint portions with respect to the radial direction, and the axial height of the joint portions is made different from that of the turn portions adjoining the joint portions in the radial direction or other joint portions so as to eliminate the possibility of short-circuiting attributable to the joint portions, thereby allowing improved insulating properties and improved weldability to be achieved.

According to one aspect of the present invention, there is provided a stator of a dynamo-electric machine including a stator iron core provided with a plurality of slots arranged in a circumferential direction, and a stator winding constructed by joining a plurality of strands of wire installed in the slots spaced away by a predetermined number of the slots on an end surface of the stator iron core, wherein both coil-end groups of the stator winding are constructed by the joint portions interconnecting the strands of wire on the end surface of the stator iron core and turn portions of the strands of wire that extend out of one slot and enter another slot, the slots being spaced away from each other by a predetermined number of slots, on the end surface of the stator iron core, and on at least one coil-end group of the stator winding, the joint portions are disposed adjacently to the turn portions in the radial direction.

According to another aspect of the present invention, there is provided a stator of a dynamo-electric machine including a stator iron core provided with a plurality of slots arranged in a circumferential direction, and a stator winding constructed by joining a plurality of strands of wire installed in the slots spaced away by a predetermined number of the slots on an end surface of the stator iron core, wherein both coil-end groups of the stator winding are constructed by the joint portions interconnecting the strands of wire on the end surface of the stator iron core and turn portions of the strands of wire that extend out of one slot and enter the other slot, the slots being spaced apart from each other by a predetermined number of slots, on the end surface of the stator iron core, and on at least one coil-end group of the stator winding, the joint portions are disposed adjacently to the turn portions or other joint portions in the radial direction, and the axial height of the joint portions and the axial height of the turn portions adjacent to the joint portions in the radial direction or other joint portions are different.

In a preferred form, on at least one coil-end group of the stator winding, the joint portions, or the joint portions and the turn portions are stacked in three or more layers in one row in the radial direction.

In another preferred form, on at least one coil-end group of the stator winding, the turn portions are positioned adjacently to the joint portions at an inner radial side and an outer radial side of the joint portions and aligned in three layers in one row in the radial direction, and the axial height of the joint portions is greater than the axial height of the turn portions.

In yet another preferred form, an insulating resin is provided to cover the joint portions.

In a further preferred form, the insulating resin is provided between the joint portions adjoining in the radial direction and between the joint portions and the turn portions adjoining in the radial direction.

In another preferred form, varnish is applied to the coil-end groups.

In still another preferred from, on at least one coil-end group, the turn portion is located at an outermost radial position in the radial direction.

In another preferred from, the joint portion located at an outermost radial position is formed to have a lower axial height than the joint portion or the turn portion that is adjacent thereto in the radial direction.

DESCRIPTION OF THE PREFERRED EMBODIMENTS

The following will describe the embodiments of the present invention in conjunction with the accompanying drawings.

First Embodiment

Figure 1:
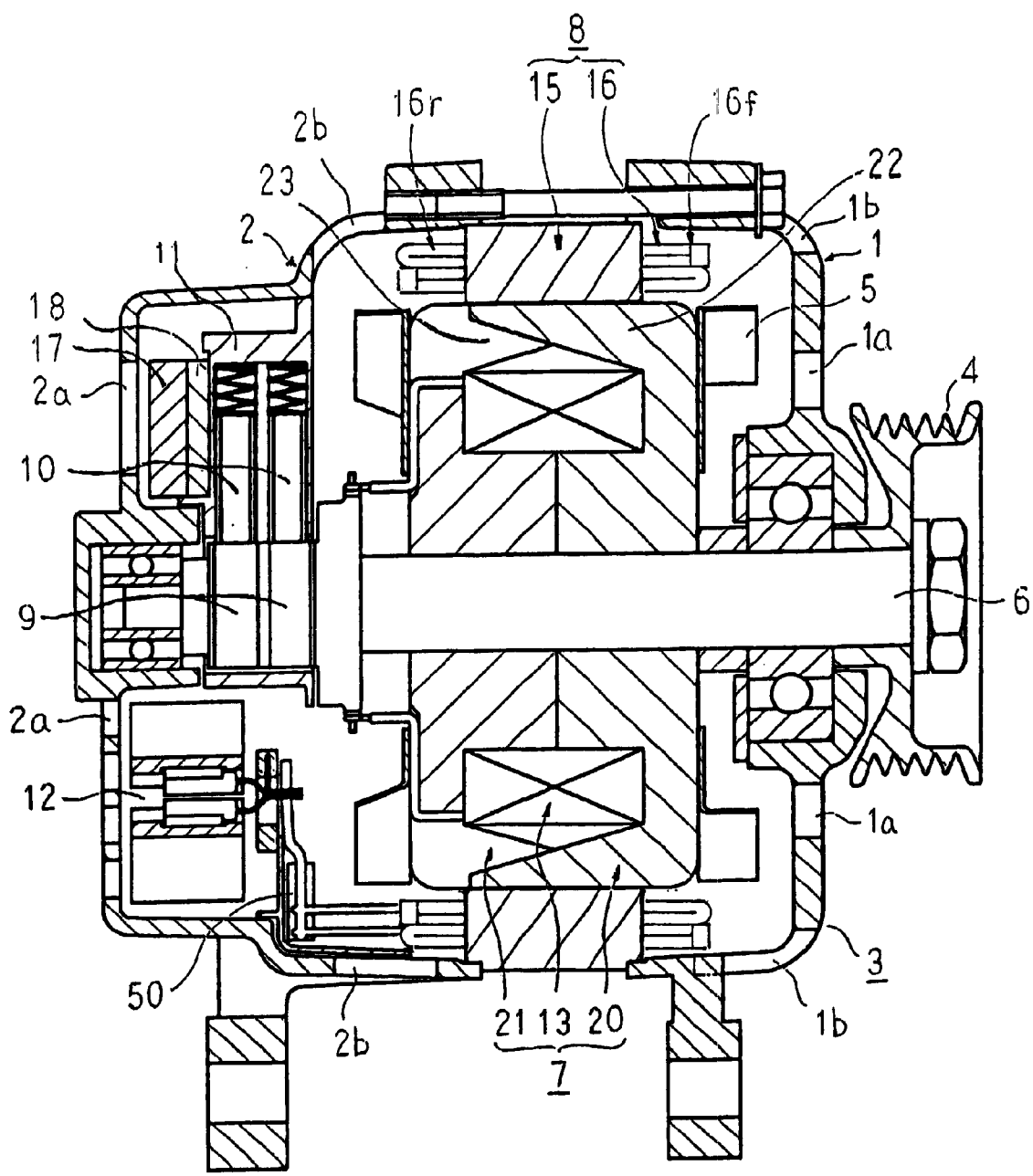
FIG. 1 is a block diagram of a longitudinal sectional view showing an automotive alternator according to a first embodiment of the present invention.
Figure 2:
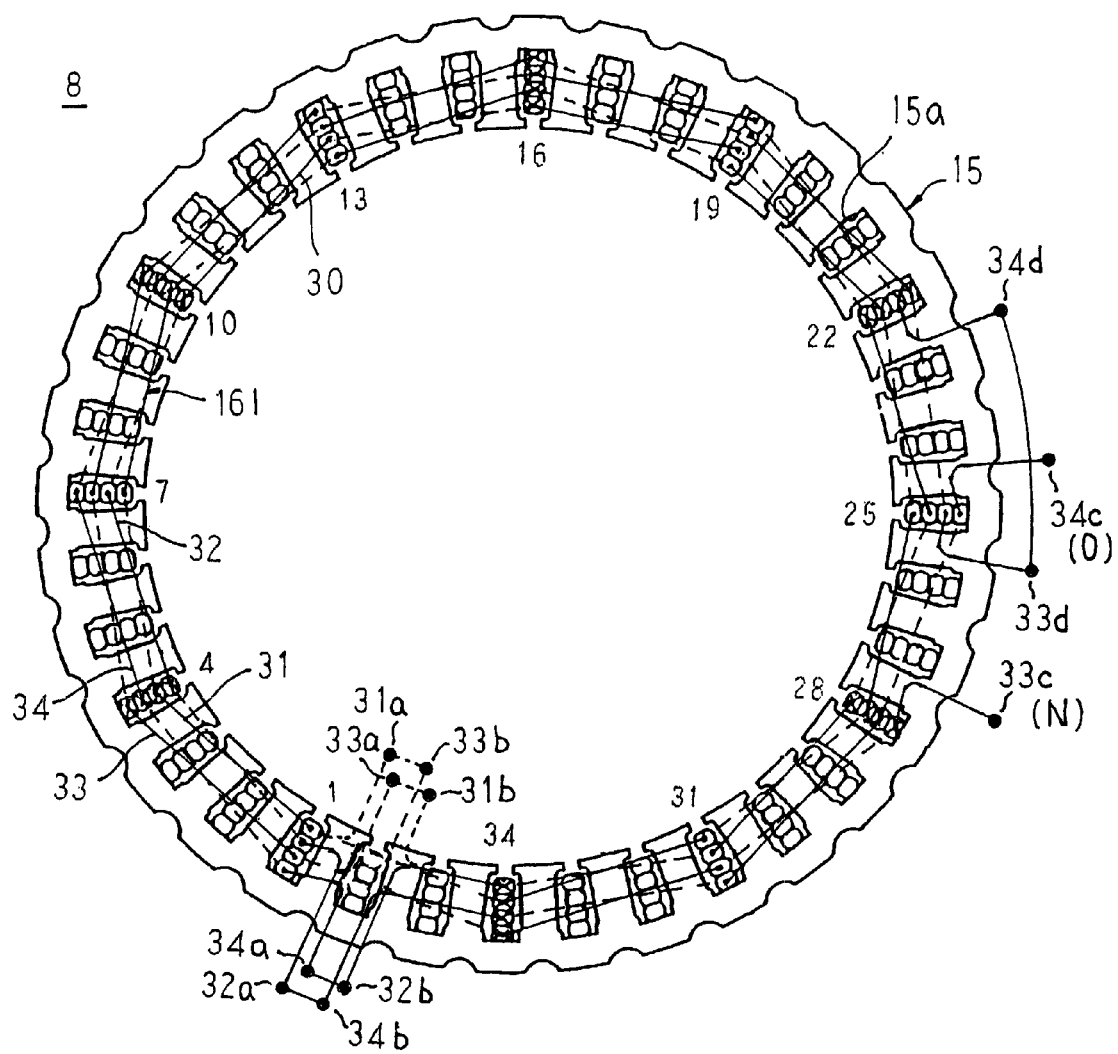
FIG. 2 is a rear end surface view illustrating a connection state of a stator winding for one phase in a stator applied to the automotive alternator according to the first embodiment of the present invention.
Figure 3:
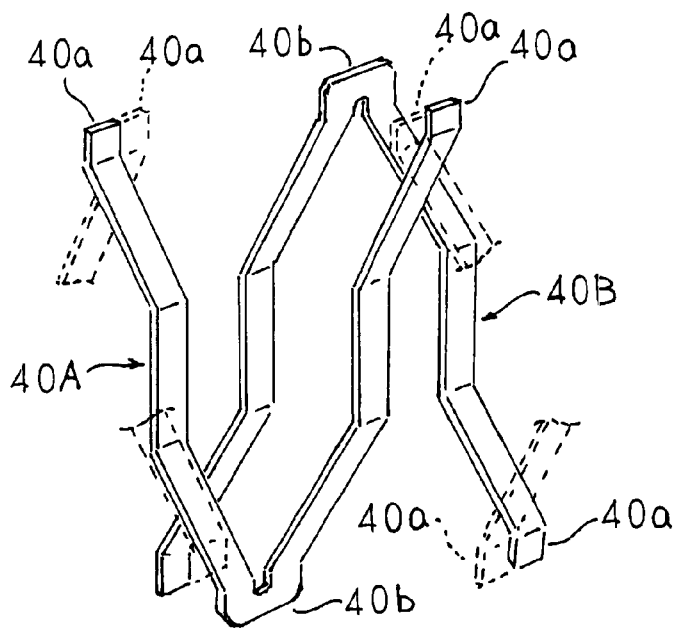
FIG. 3 is a schematic perspective view showing conductor segments constituting the stator winding in the stator of the automotive alternator according to the first embodiment of the present invention.
Figure 4:
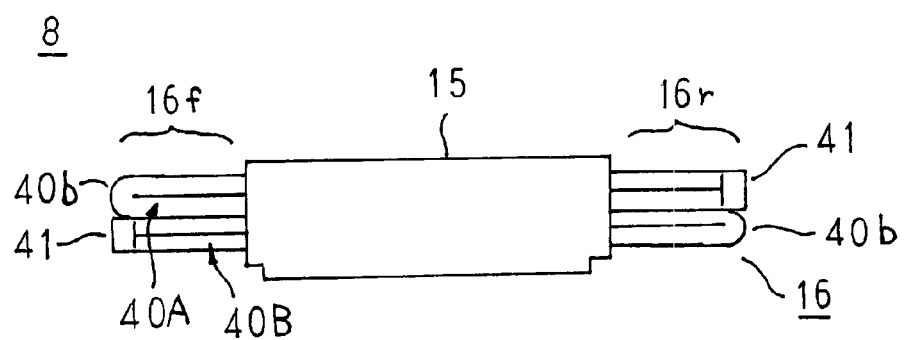
FIG. 4 is a simplified view showing coil-end groups in the stator of the automotive alternator according to the first embodiment of the present invention.

FIG. 1 is a block diagram of a longitudinal sectional view showing an automotive alternator according to a first embodiment of the present invention, FIG. 2 is a rear end surface view illustrating a connection state of a stator winding for one phase in a stator applied to the automotive alternator according to the first embodiment of the present invention, FIG. 3 is a schematic perspective view showing conductor segments constituting the stator winding in the stator of the automotive alternator according to the first embodiment of the present invention, and FIG. 4 is a simplified view showing coil-end groups in the stator of the automotive alternator according to the first embodiment of the present invention. In FIG. 2, a rear coil end is indicated by a solid line, while a front coil end is indicated by a dashed line.

Referring to FIG. 1, the automotive alternator is equipped with a case 3 constructed by a front bracket 1 and a rear bracket 2 made of aluminum, a shaft 6 that is provided in the case 3 and has a pulley 4 secured to one end thereof, a Lundell-type rotor 7 secured to the shaft 6, fans 5 secured to both axial ends of the rotor 7, a stator 8 secured to the case 3 such that it surrounds the rotor 7, slip rings 9 secured to the other end of the shaft 6 to supply electric current to the rotor 7, a pair of brushes 10 that slides on the surface of slip rings 9, a brush holder 11 accommodating the brushes 10, a rectifier 12 that is electrically connected to the stator 8 and rectifies alternating current generated at the stator 8 into direct current, and a regulator 18 fitted to the brush holder 11 to regulate the magnitude of an ac voltage generated at the stator 8.

The rotor 7 is equipped with a field coil 13 that generates magnetic fluxes on passage of current, and a first pole core member 20 and a second pole core member 21 which are provided so that they cover the field coil 13 and wherein magnetic poles are formed by the magnetic fluxes. The first and second pole core members 20 and 21 are made of iron, the pole core members 20 and 21, respectively, have claw-shaped magnetic poles 22 and 23 whose outermost diametrical surfaces have a virtually trapezoidal shape, the claw-shaped magnetic poles 22 and 23 being disposed on an outer circumferential perimeter at equiangular pitches in a circumferential direction so as to project axially. The pole core members 20 and 21 are secured to the shaft 6 facing each other such that the claw-shaped magnetic poles 22 and 23 intermesh.

The stator 8 is formed by a cylindrical stator iron core 15 composed of laminated magnetic steel plates, and a stator winding 16 wound around the stator iron core 15. The stator 8 is provided such that a front coil-end group 16f and a rear coil-end group 16r of the stator winding 16 are positioned radially outward with respect to the shoulders of the first pole core member 20 and the second pole core member 21.

The front bracket 1 and the rear bracket 2 have air intake openings 1a and 2a drilled in the axial end surfaces thereof, and air discharge openings 1b and 2b drilled in the radial side surfaces thereof such that they face against the coil-end groups 16f and 16r. In this arrangement, the fans 5 are rotationally driven as the rotor 7 rotates, outside air is taken into the case 3 through the air intake openings 1a and 2a, passed toward the rotor 7 in the axial direction, and deflected in a centrifugal direction by the fans 5. Thereafter, the air cools the coil-end groups 16f and 16r, then are discharged outside through the air discharge openings 1b and 2b, thus forming cooling air passages.

Descriptions will now be given of a stator winding phase group for one phase constituting the stator winding 16, by referring to FIG. 2. In this example, it is assumed that the rotor 7 has twelve magnetic poles, and the stator iron core 15 has thirty-six slots 15a arranged in a circumferential direction such that they open toward an inner peripheral side. In other words, the number of slots per pole, per phase is one.

A stator winding phase group 161 for one phase is composed of first through fourth winding sub-portions 31 through 34. The first winding sub-portion 31 is constructed by winding a strand of wire 30 into a wave winding in every third slot (one magnetic pole pitch) from a slot No. 1 to a slot No. 34 so as to alternating occupy a first address and a second address inside the slots 15a. The second winding sub-portion 32 is constructed by winding the strand of wire 30 into a wave winding in every third slot from the slot No. 1 to the slot No. 34 so as to alternating occupy the second address and the first address inside the slots 15a. Similarly, the third winding sub-portion 33 is constructed by winding the strand of wire 30 into a wave winding in every third slot from the slot No. 1 to the slot No. 34 so as to alternating occupy a third address and a fourth address inside the slots 15a. The fourth winding sub-portion 34 is constructed by winding the strand of wire 30 into a wave winding in every third slot from the slot No. 1 to the slot No. 34 so as to alternating occupy the fourth address and the third address inside the slots 15a. In each of the slots 15a, the four strands of wire 30 are arranged in one row in the radial direction.

At the front side of the stator iron core 15, an end portion 31a of the first winding sub-portion 31 that extends out of the slot No. 1 and an end portion 33b of the third winding sub-portion 33 that extends out of the slot No. 34 are joined, and an end portion 33a of the third winding sub-portion 33 that extends out of the slot No. 1 and an end portion 31b of the first winding sub-portion 31 that extends out of the slot No. 34 are joined, thereby forming a two-turn, wave-wound winding.

Furthermore, at the rear side of the stator iron core 15, an end portion 32a of the second winding sub-portion 32 that extends out of the slot No. 1 and an end portion 34b of the fourth winding sub-portion 34 that extends out of the slot No. 34 are joined, and an end portion 34a of the fourth winding sub-portion 34 that extends out of the slot No. 1 and an end portion 32b of the second winding sub-portion 32 that extends out of the slot No. 34 are joined, thereby forming a two-turn, wave-wound winding.

Furthermore, an end portion 34d of the fourth winding sub-portion 34 that extends out of a slot No. 22 to the rear side and an end portion 33d of the third winding sub-portion 33 that extends out of a slot No. 25 to the rear side are joined, thereby forming the four-turn stator winding phase group 161 for one phase that is configured by connecting the first through fourth winding sub-portions 31 through 34 in series.

An end portion 34c of the fourth winding sub-portion 34 that extends out of a slot No. 25 to the rear side and an end portion 33c of the third winding sub-portion 33 that extends out of a slot No. 28 to the rear side provide a lead wire (O) and a neutral point (N), respectively, of the stator winding phase group 161.

In the same manner, the stator winding phase groups 161 for three phases are formed by shifting the slots 15a, in which the strand of wire 30 is inserted, by one slot.

Although not shown, the stator winding phase groups 161 for three phases configured as set forth above make up the stator winding 16 formed of a single three-phase ac winding by ac connection, such as star connection.

To be more specific, as shown in FIG. 3, the stator winding 16 is constituted by employing the strand of wire 30 composed of a first short conductor segment 40A and a second short conductor segment 40B that are made of copper constituents that are covered with an insulating film, have a rectangular cross section, and are substantially formed into a U shape. More specifically, each of the first conductor segments 40A and each of the second conductor segment 40B are inserted from the front side and the rear side into each pair of the slots 15a which are spaced apart from each other by two slots. At this time, the first conductor segment 40A is inserted at the first address in a first slot 15a and the second address in a second slot 15a that is the third slot from the first slot 15a. The second conductor segment 40B is inserted at the third address in the first slot 15a and the fourth address in the second slot 15a that is the third slot from the first slot 15a. In each slot 15a, the first and second conductor segments 40A and 40B are arranged in four layers in a single radial row such that the longer sides of the rectangular cross sections thereof are oriented in the radial direction.

An end portion 40a of the first conductor segment 40A that extends out of the first slot 15a to the rear side is joined to the end portion 40a of the adjacent first conductor segment 40A that extends out of the second slot 15a, which is the third slot from the first slot 15a, to the rear side so as to make up the one-turn, wave-wound windings corresponding to the first winding sub-portion 31 and the second winding sub-portion 32 shown in FIG. 2.

Similarly, an end portion 40a of the second conductor segment 40B that extends out of the first slot 15a to the front side is joined to the end portion 40a of the adjacent second conductor segment 40B that extends out of the second slot 15a, which is the third slot from the first slot 15a, to the front side so as to make up the one-turn, wave-wound windings corresponding to the third winding sub-portion 33 and the fourth winding sub-portion 34 shown in FIG. 2.

Furthermore, the first and second conductor segments 40A and 40B, respectively, are joined according to the connection method illustrated in FIG. 2 thereby to make up the stator winding phase group 161 for one phase composed of four one-turn wave-wound windings connected in series.

In the stator winding 16 constructed as described above, a turn portion 40b of the first conductor segment 40A and a joint portion 41 of the end portions 40a of the second conductor segment 40B are stacked in two layers and aligned in a single row in the radial direction, being regularly disposed in two rows in the circumferential direction, thus making up the front coil-end group 16f. Similarly, a turn portion 40b of the second conductor segment 40B and the joint portion 41 of the end portions 40a of the first conductor segment 40A are stacked in two layers and aligned in a single row in the radial direction, being regularly disposed in two rows in the circumferential direction, thus making up the rear coil-end group 16r. In the front and rear coil-end groups 16f and 16r, the turn portions 40b and the joint portions 41 are adjacently disposed in the radial direction so that they are substantially flush with each other in the axial direction, as shown in FIG. 4.

According to the first embodiment, in the coil-end groups 16f and 16r of the stator winding 16, the turn portions 40b and the joint portions 41 are adjacently arranged in two layers and in one row in the radial direction, being regularly disposed in two rows in the circumferential direction. Hence, the joint portions 41 wherein the insulating film has been lost due to welding are disposed in the radial direction adjacently to the turn portions 40b that have the insulating film. This means that the joint portions 41 with no insulating film are not adjacently arranged in the radial direction, so that short-circuiting in the coil-end groups 16f and 16r attributable to the joint portions 41 will be suppressed, thus making it possible to provide the stator 8 featuring good insulating properties.

Therefore, in an automotive alternator provided with the stator 8 is able to suppress the occurrence of short-circuiting in the coil-end groups 16f and 16r caused by vibrations, permitting higher reliability to be achieved.

Second Embodiment

Figure 5:
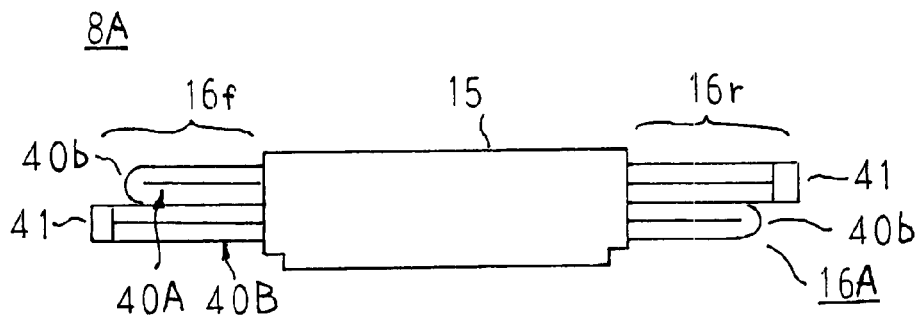
FIG. 5 is a simplified view showing coil-end groups in a stator of an automotive alternator according to a second embodiment of the present invention.

In the above first embodiment, the coil-end groups 16f and 16r of the stator winding 16 are formed by the turn portions 40b and the joint portions 41 that are arranged in double layers in a single row in the radial direction, being regularly disposed in two rows in the circumferential direction, and the turn portions 40b and the joint portions 41 being substantially flush with each other in the axial direction. In a second embodiment, coil-end groups 16f and 16r of a stator winding 16A are formed by turn portions 40b and the joint portions 41 that are arranged in double layers in a single row in the radial direction, being regularly disposed in two rows in the circumferential direction, and the axial height of the joint portions 41 is greater than that of the turn portions 40b, as shown in FIG. 5.

Hence, according to the second embodiment, since the axial height of the joint portions 41 is greater than the axial height of the turn portions 40b in the coil-end groups 16f and 16r of the stator winding 16A of a stator 8A, welding efficiency can be improved, and short-circuiting attributable to the joint portions 41 can be prevented because the joint portions 41 wherein an insulating film has been lost due to welding are spaced apart from the turn portions 40b. Thus, good insulating properties can be obtained.

Moreover, applying the stator 8A to an automotive alternator reduces the danger of short-circuiting between the joint portions 41 due to vibrations, thus enhancing reliability. In addition, the axial height of the turn portions 40b located at the outermost diametrical position is smaller in the coil-end group 16r, thus allowing a gap to be secured between the coil-end group 16r and a bracket 2, so that short-circuiting therebetween can be suppressed.

Third Embodiment

Figure 6:
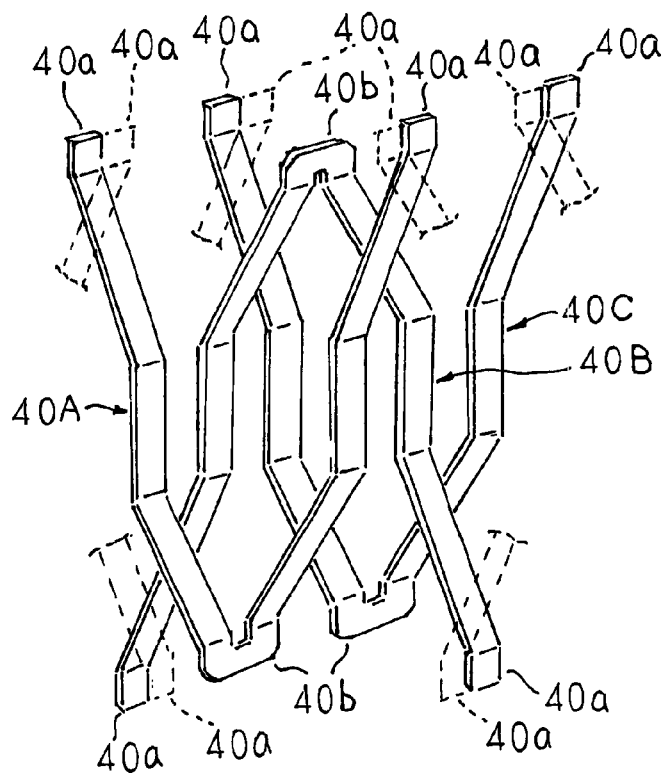
FIG. 6 is a schematic perspective view showing conductor segments constituting the stator winding in a stator of an automotive alternator according to a third embodiment of the present invention.
Figure 7:
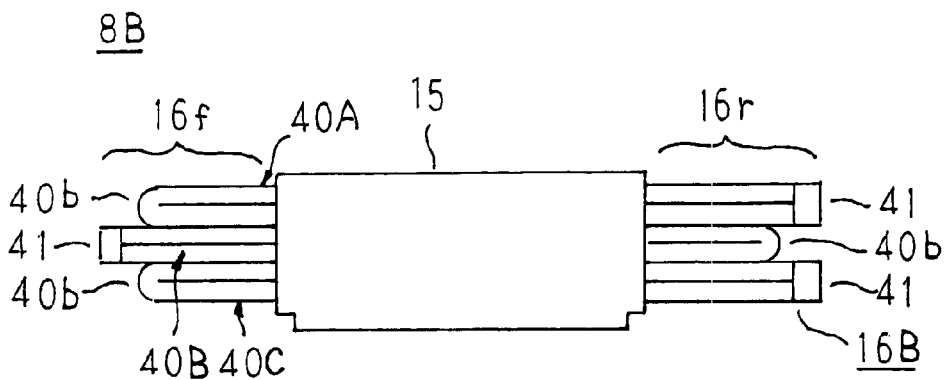
FIG. 7 is a simplified view showing coil-end groups in the stator of the automotive alternator according to the third embodiment of the present invention.

FIG. 6 is a schematic perspective view showing conductor segments constituting the stator winding in a stator of an automotive alternator according to a third embodiment of the present invention, and FIG. 7 is a simplified view showing coil-end groups in the stator of the automotive alternator according to the third embodiment of the present invention.

As shown in FIG. 6, the strand of wire of the third embodiment is formed by a first short conductor segment 40A, a second short conductor segment 40B, and a third short conductor segment 40C made of a copper constituent that is covered with an insulating film, has a rectangular cross section, and is substantially formed into a U shape. More specifically, each of the first conductor segments 40A, each of the second conductor segment 40B, and each of the third conductor segment 40C are inserted from the front side and the rear side into each pair of slots 15a which are spaced two slots apart from each other. At this time, the first conductor segment 40A is inserted into a first address in a first slot 15a and a second address in a second slot 15a that is the third slot from the first slot 15a. The second conductor segment 40B is inserted into a third address in the first slot 15a and a fourth address in the second slot 15a that is the third slot from the first slot 15a. The third conductor segment 40C is inserted at a fifth address in the first slot 15a and a sixth address in the second slot 15a that is the third slot from the first slot 15a. In each slot 15a, the first, second, and third conductor segments 40A, 40B, and 40C, respectively, are arranged in six layers aligned in a single row in the radial direction such that the longer sides of the rectangular cross sections thereof are oriented in the radial direction.

An end portion 40a of the first conductor segment 40A that extends out of the first slot 15a to the rear side is joined to the end portion 40a of the adjacent first conductor segment 40A that extends out of the second slot 15a, which is the third slot from the first slot 15a, to the rear side so as to make up the one-turn, wave-wound windings corresponding to the first winding sub-portion 31 and the second winding sub-portion 32 shown in FIG. 2.

Similarly, an end portion 40a of the second conductor segment 40B that extends out of the first slot 15a to the front side is joined to the end portion 40a of the adjacent second conductor segment 40B that extends out of the second slot 15a, which is the third slot from the first slot 15a, to the front side so as to make up the one-turn, wave-wound windings corresponding to the third winding sub-portion 33 and the fourth winding sub-portion 34 shown in FIG. 2.

Furthermore, an end portion 40a of the third conductor segment 40C that extends out of the first slot 15a to the rear side is joined to the end portion 40a of the adjacent third conductor segment 40C that extends out of the second slot 15a, which is the third slot from the first slot 15a, to the rear side so as to make up the one-turn, wave-wound windings.

Furthermore, the first, second, and third conductor segments 40A, 40B, and 40C, respectively, are joined to constitute a stator winding phase group for one phase including six turns constructed by connecting six one-turn, wave-wound windings in series.

In the same manner, the stator winding phase groups for three phases are formed by shifting the slots 15a, in which the first, second, and third conductor segments 40A, 40B, and 40C, respectively, are inserted, by one slot.

Lastly, the stator winding phase groups for three phases are connected by, for example, the star connection to provide a stator winding 16B composed of one three-phase AC winding.

In the stator winding 16B of a stator 8B constructed as set forth above, the turn portion 40b of the first conductor segment 40A, the joint portion 41 of the end portions 40a of the second conductor segment 40B, and the turn portion 40b of the third conductor segment 40C are arranged in three layers aligned in a single row in the radial direction, being regularly disposed in three rows in the circumferential direction thereby to make up the front coil-end group 16f. Similarly, the joint portion 41 of the end portions 40a of the first conductor segment 40A, the turn portion 40b of the second conductor segment 40B, and the joint portion 41 of the end portions 40a of the third conductor segment 40C are arranged in three layers aligned in a singe row in the radial direction, and being regularly arrayed in three rows in the circumferential direction thereby to make up the rear coil-end group 16r.

Furthermore, in the front coil-end group 16f, the turn portion 40b, the joint portion 41, and the turn portion 40b are adjacently disposed in three layers in the radial direction, and the axial height of the joint portion 41 is greater than the axial height of the turn portions 40b, as shown in FIG. 7. In the rear coil-end group 16r, the joint portion 41, the turn portion 40b, and the joint portion 41 are adjacently disposed in three layers in the radial direction, and the axial height of the joint portions 41 is greater than the axial height of the turn portion 40b, as shown in FIG. 7.

Thus, in the third embodiment, the axial height of the joint portions 41 is greater than the axial height of the turn portion 40b adjacent thereto in the radial direction, as in the case of the second embodiment. According to the third embodiment, therefore, welding efficiency can be improved, and short-circuiting attributable to the joint portions 41 can be prevented because the joint portions 41 wherein an insulating film has been lost due to welding are spaced apart from the turn portions 40b, thus permitting good insulating properties to be obtained.

Moreover, the axial height of the joint portions 41 is greater than the axial height of the turn portion 40b adjacent thereto in the radial direction, so that welding efficiency or insulating properties will not be deteriorated even if the joint portions 41 and the turn portions 40b are arranged in multiple layers in the radial direction, presenting a structure ideally suited for multi-layer coil ends.

In the coil-end group 16f, the axial height of the turn portion 40b located at the outermost diametrical position is smaller, so that a gap between the group of coil ends 16f and the bracket 1 is secured to prevent short-circuiting therebetween.

Fourth Embodiment

Figure 8:
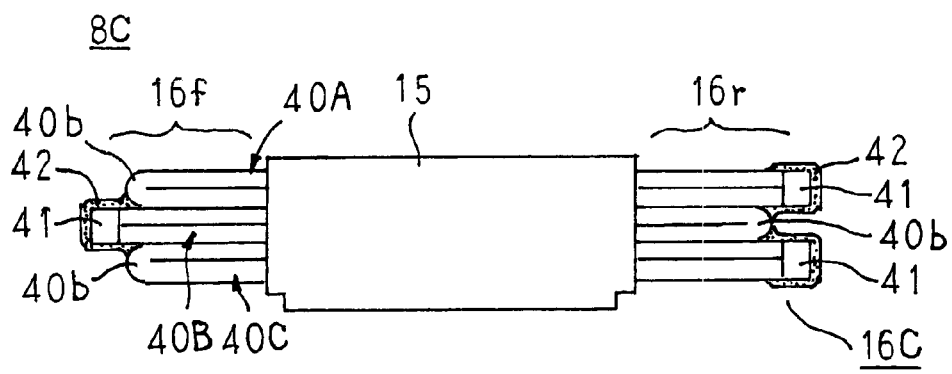
FIG. 8 is a simplified view showing coil-end groups in a stator of an automotive alternator according to a fourth embodiment of the present invention.

In a fourth embodiment, as shown in FIG. 8, an insulating resin 42, such as an epoxy resin, is provided to cover joint portions 41 and to extend over the joint portions 41 and turn portions 40b adjacent to the joint portions 41 in the radial direction. The rest of the configuration is the same as the configuration of the above third embodiment.

In a stator winding 16C of a stator 8C according to the fourth embodiment, the joint portions 41 are covered with the insulating resin 42. Hence, no joint portions 41 that have lost an insulating film due to welding will be exposed, so that insulating properties will be further improved. In addition, the joint portions 41 are enforced by the insulating resin 42, suppressing the occurrence of disconnection of welded spots caused by vibrations. Accordingly, installing the stator 8C on an automotive alternator will further improve resistance to vibrations, permitting higher reliability to be achieved.

Furthermore, since the joint portions 41 and the turn portions 40b are thermally coupled by the insulating resin 42, if the heat generated at each of the winding sub-portions making up the stator winding 16C is unbalanced, then the heat of a winding sub-portion of a higher temperature is transmitted to the turn portions 40b from, for example, the joint portion 41 via the insulating resin 42, thereby achieving even temperature distribution in the coil-end groups 16f and 16r. This arrangement enables the automotive alternator to provide higher output.

The insulating resin 42 does not cover the entire coil-end groups 16f and 16r; hence, it does not interfere with the cooling of the coil-end groups 16f and 16r by the cooling fans 5 when the stator 8C is mounted on the automotive alternator.

The joint portion 41 located at the outermost diametrical position of the coil-end group 16r is covered with the insulating resin 42. Hence, even if brackets 1 and 2 for grounding and the coil-end groups 16f and 16r come in contact when the stator 8C is mounted on the automotive alternator, the joint portion 41 will be protected against corrosion caused by leakage current.

In the coil-end group 16f, since the axial height of the turn portion 40b located at the outermost diametrical position is smaller, the gap between the coil-end group 16r and the bracket 2 is secured to prevent short-circuiting therebetween.

Fifth Embodiment

In the above fourth embodiment, the insulating resin 42, such as an epoxy resin, is provided to cover the joint portions 41. In a fifth embodiment, varnish is applied to the entire coil-end groups 16f and 16r.

According to the fifth embodiment, the joint portions 41, which have lost an insulating film due to welding, are covered with varnish to improve insulating properties.

The varnish is applied to cover the turn portion 40b of the first conductor segment 40A, the joint portions 41 of the end portions 40a of the second conductor segment 40B, and the turn portion 40b of the third conductor segment 40C, which are radially adjacent. Hence, the heat of a winding sub-portion of a higher temperature is transmitted to a winding sub-portion of a lower temperature via the varnish, thus accomplishing even temperature distribution of the coil-end groups 16f and 16r.

Circumferential gaps between the turn portion 40b of the first conductor segment 40A, the joint portion 41 of the end portions 40a of the second conductor segment 40B, and the turn portion 40b of the third conductor segment 40C are secured. Therefore, the cooling of the coil-end groups 16f and 16r by the cooling fans 5 will not be interfered when the stator is mounted on the automotive alternator.

Sixth Embodiment

Figure 9:
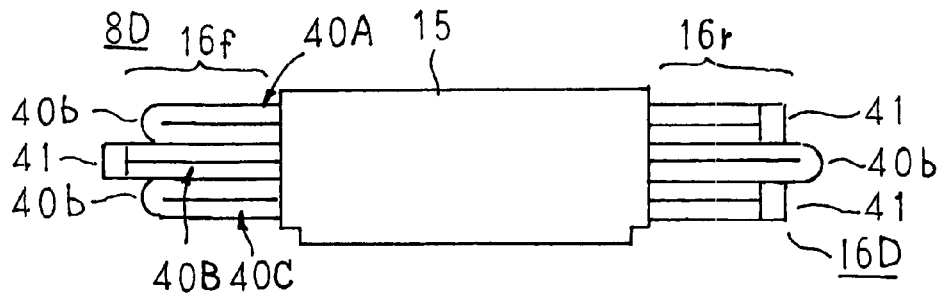
FIG. 9 is a simplified view showing coil-end groups in a stator of an automotive alternator according to a sixth embodiment of the present invention.

As shown in FIG. 9, in a stator winding 16D of a stator 8D according to a sixth embodiment, a turn portion 40b of a first conductor segment 40A, a joint portion 41 of end portions 40a of a second conductor segment 40B, and a turn portion 40b of a third conductor segment 40C are arranged in three layers in a single row in the radial direction, being regularly disposed in three rows in the circumferential direction so as to make up a front coil-end group 16f. Furthermore, a joint portion 41 of end portions 40a of a first conductor segment 40A, the turn portion 40b of the second conductor segment 40B, and the joint portion 41 of the end portions 40a of the third conductor segment 40C are arranged in three layers in a single row in the radial direction, being regularly disposed in three rows in the circumferential direction so as to make up a rear coil-end group 16r.

Furthermore, in the front coil-end group 16f, the turn portion 40b, the joint portion 41, and the turn portion 40b are adjacently disposed in three layers in the radial direction, and the axial height of the joint portion 41 is greater than the axial height of the turn portions 40b, as shown in FIG. 9. In the rear coil-end group 16r, the joint portion 41, the turn portion 40b, and the joint portion 41 are adjacently disposed in three layers in the radial direction, and the axial height of the turn portion 40b is greater than the axial height of the joint portion 41, as shown in FIG. 9.

Thus, in the coil-end group 16f of the sixth embodiment, the axial height of the joint portions 41 is greater than the axial height of the turn portion 40b adjacent thereto in the radial direction, as in the case of the third embodiment. According to the sixth embodiment, therefore, welding efficiency can be improved, and short-circuiting attributable to the joint portions 41 can be prevented because the joint portions 41 wherein an insulating film has been lost due to welding are spaced apart from the turn portions 40b, thus permitting good insulating properties to be obtained. In the coil-end group 16r, the axial height of the turn portion 40b is greater than the axial height of the joint portions 41 adjacent thereto in the radial direction; therefore, welding efficiency can be improved, and short-circuiting attributable to the joint portions 41 can be suppressed because the joint portions 41 wherein an insulating film has been lost due to welding are spaced apart from the turn portions 40b, thus permitting good insulating properties to be obtained.

Moreover, in the stator 8D, the axial height of the turn portion 40b and the joint portion 41 located at a radial outermost position is smaller than the axial height of the joint portion 41 and the turn portion 40b adjacent thereto in the radial direction. Hence, when the stator 8D is mounted on an automotive alternator, the interference between brackets 1 and 2 and the turn portion 40b and the joint portion 41 located at the radial outermost position will be suppressed. More specifically, the brackets 1 and 2 require a draft because they are die-formed, and the inner diameters of the brackets 1 and 2 at the opening side are formed to gradually decrease in the direction of the depth thereof. Accordingly, if the axial height of the coil-end groups 16f and 16r at radial outermost ends thereof is great, then the inner wall surfaces of the brackets 1 and 2 would interfere with the coil-end groups 16f and 16r. The interference with the brackets 1 and 2, however, can be suppressed by reducing the axial height of the coil-end groups 16f and 16r at the radial outermost ends thereof. With this arrangement, the gaps between the brackets 1 and 2 and the coil-end groups 16f and 16r are secured, so that the joint portions 41 will be protected against corrosion caused by leakage current, and short-circuiting between the inner wall surfaces of the brackets 1 and 2 and the coil-end groups 16f and 16r caused by vibrations will be also suppressed.

Seventh Embodiment

In the first through sixth embodiments described above, the stator windings are formed by wave-wound windings. In a seventh embodiment, the stator winding is formed by combining the lap-wound windings and wave-wound windings.

Figure 10:
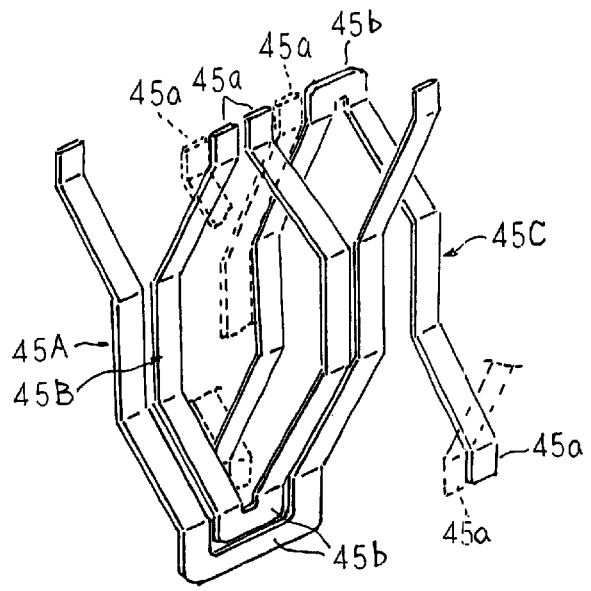
FIG. 10 is a schematic perspective view showing conductor segments constituting a stator winding in a stator of an automotive alternator according to a seventh embodiment of the present invention.
Figure 11:
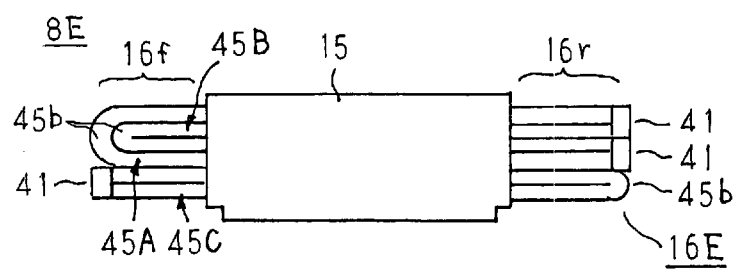
FIG. 11 is a simplified view showing coil-end groups in the stator of the automotive alternator according to the seventh embodiment of the present invention.

FIG. 10 is a schematic perspective view showing conductor segments constituting a stator winding in a stator of an automotive alternator according to a seventh embodiment of the present invention. FIG. 11 is a simplified view showing coil-end groups in the stator of the automotive alternator according to the seventh embodiment of the present invention.

As shown in FIG. 10, the strand of wire of the seventh embodiment is formed by a first short conductor segment 45A, a second short conductor segment 45B, and a third short conductor segment 45C made of a copper constituent that is covered with an insulating film, has a rectangular cross section, and is substantially formed into a U shape. More specifically, each of the first conductor segments 45A and each of the second conductor segment 45B are inserted from the front side into each pair of slots 15a which are two slots apart from each other, and the third conductor segment 45C is inserted from the rear side into each pair of slots 15a which are two slots apart from each other. At this time, the first conductor segment 45A is inserted into a first address in a first slot 15a and a fourth address in a second slot 15a that is the third slot from the first slot 15a. The second conductor segment 45B is inserted into a second address in the first slot 15a and a third address in the second slot 15a that is the third slot from the first slot 15a. The third conductor segment 45C is inserted at a fifth address in the first slot 15a and a sixth address in the second slot that is the third slot from the first slot 15a. In each slot 15a, the first, second, and third conductor segments 45A, 45B, and 45C, respectively, are arranged in six layers aligned in a single row in the radial direction such that the longer sides of the rectangular cross sections thereof are oriented in the radial direction.

An end portion 45a of the second conductor segment 45B that extends out from the second address of the first slot 15a to the rear side is joined to the end portion 45a of the first conductor segment 45A that extends out from the first address of the second slot 15a, which is the third slot from the first slot 15a, to the rear side. Furthermore, the end portion 45a of the first conductor segment 45A that extends out at the fourth address of the first slot 15a to the rear side is joined to the end portion 45a of the second conductor segment 45B that extends out from the third address of the second slot 15a, which is the third slot from the first slot 15a, to the rear side. Thus, a four-turn, lap-wound winding is formed.

Similarly, an end portion 45a of the third conductor segment 40C that extends out from the fifth address of the first slot 15a to the front side is joined to the end portion 45a of the adjacent third conductor segment 45C that extends out from the sixth address of the second slot 15a, which is the third slot from the first slot 15a, to the front side so as to make up two one-turn, wave-wound windings.

Furthermore, the first, second, and third conductor segments 45A, 45B, and 45C, respectively, are joined to constitute a stator winding phase group for one phase including six turns constructed by connecting the single four-turn, lap-wound winding and the two one-turn, wave-wound windings in series.

In the same manner, the stator winding phase groups for three phases are formed by shifting the slots 15a, in which the first, second, and third conductor segments 45A, 45B, and 45C, respectively, are inserted, by one slot.

Lastly, the stator winding phase groups for three phases are connected by, for example, the star connection to provide a stator winding 16E composed of one three-phase ac winding.

In the stator winding 16E of a stator 8E constructed as set forth above, a turn portion 45b of the first conductor segment 45A and the turn portion 45b of the second conductor segment 45B arranged in two layers in the axial direction, and joint portions 41 of the end portions 45a of the third conductor segment 45C are aligned in a single row in the radial direction, being regularly disposed in the circumferential direction, to make up a front coil-end group 16f. Similarly, the joint portion 41 of the end portion 45a of the first conductor segment 45A and the end portion 45a of the second conductor segment 45B and the turn portion 45b of the third conductor segment 45C are arranged in three layers in a single row in the radial direction, being regularly disposed in three rows in the circumferential direction, thereby to make up a rear coil-end group 16r.

Furthermore, in the front coil-end group 16f, the turn portions 45b arranged in two layers in the axial direction and the joint portion 41 are adjacently disposed in the radial direction, and the axial heights of the joint portion 41 and the turn portion 45b on an outer layer side are substantially flush with each other, as shown in FIG. 11. In the rear coil-end group 16r, the two joint portions 41 and the turn portion 45b are adjacently disposed in three layers in the radial direction, and the axial heights of the turn portion 45b and the joint portions 41 are substantially flush with each other, as shown in FIG.

Thus, in the front coil-end group 16f according to the seventh embodiment, the joint portion 41, which has lost an insulating film due to welding, is adjacent to the turn portion 45b in the radial direction, thus suppressing short-circuiting for which the joint portion 41 is responsible.

Eighth Embodiment

Figure 12:
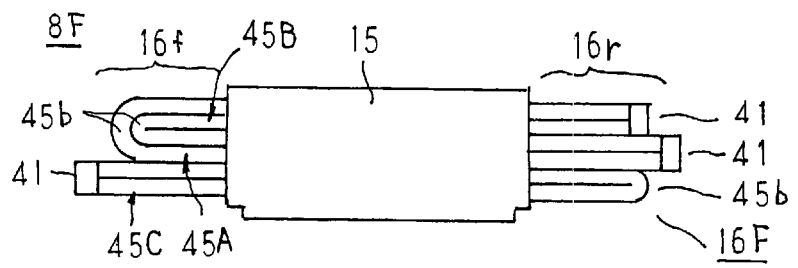
FIG. 12 is a simplified view showing coil-end groups in a stator of an automotive alternator according to an eighth embodiment of the present invention.

Referring now to FIG. 12, in a front coil-end group 16f according to an eighth embodiment, the axial height of a joint portion 41 is greater than the axial height of a turn portion 45b of an outer layer. In a rear coil-end group 16r, the axial height of the joint portion 41 on an outer radial side is greater than the axial heights of the turn portion 45b and the joint portion 41 on an inner radial side. The rest of the configuration is the same as the configuration of the above seventh embodiment.

Accordingly, in the front coil-end group 16f of a stator winding 16F of a stator 8F constructed as described above, the axial height of the joint portions 41 is greater than the axial height of the turn portion 45b adjacent thereto in the radial direction. Therefore, welding efficiency can be improved, and short-circuiting attributable to the joint portions 41 can be prevented because the joint portions 41 wherein an insulating film has been lost due to welding are spaced apart from the turn portions 45b, thus permitting good insulating properties to be obtained.

Moreover, in the rear coil-end group 16r, the axial height of the joint portions 41 is greater than the axial heights of the turn portion 45b and another joint portion 41 adjacent thereto in the radial direction. With this arrangement, welding efficiency will be improved, and short-circuiting attributable to the joint portion 41 will be suppressed because the joint portion 41, which has lost an insulating film due to welding, is spaced apart from the turn portion 45b and another joint portion 41, thus permitting good insulating properties to be achieved.

Moreover, in the coil-end group 16r, the axial height of the turn portion 45b located at the outermost diametrical position is smaller, so that a gap between the coil-end group 16r and the bracket 2 is secured to prevent short-circuiting therebetween.

Ninth Embodiment

The foregoing embodiments employ, the conductor segments substantially formed into the U shape are used as the strands of wire. A ninth embodiment employs a continuous wire as its strand of wire. In the ninth embodiment, a rotor 7 includes sixteen magnetic poles, and a stator iron core 15 has ninety-six slots, two slots per pole and phase.

Figure 13:
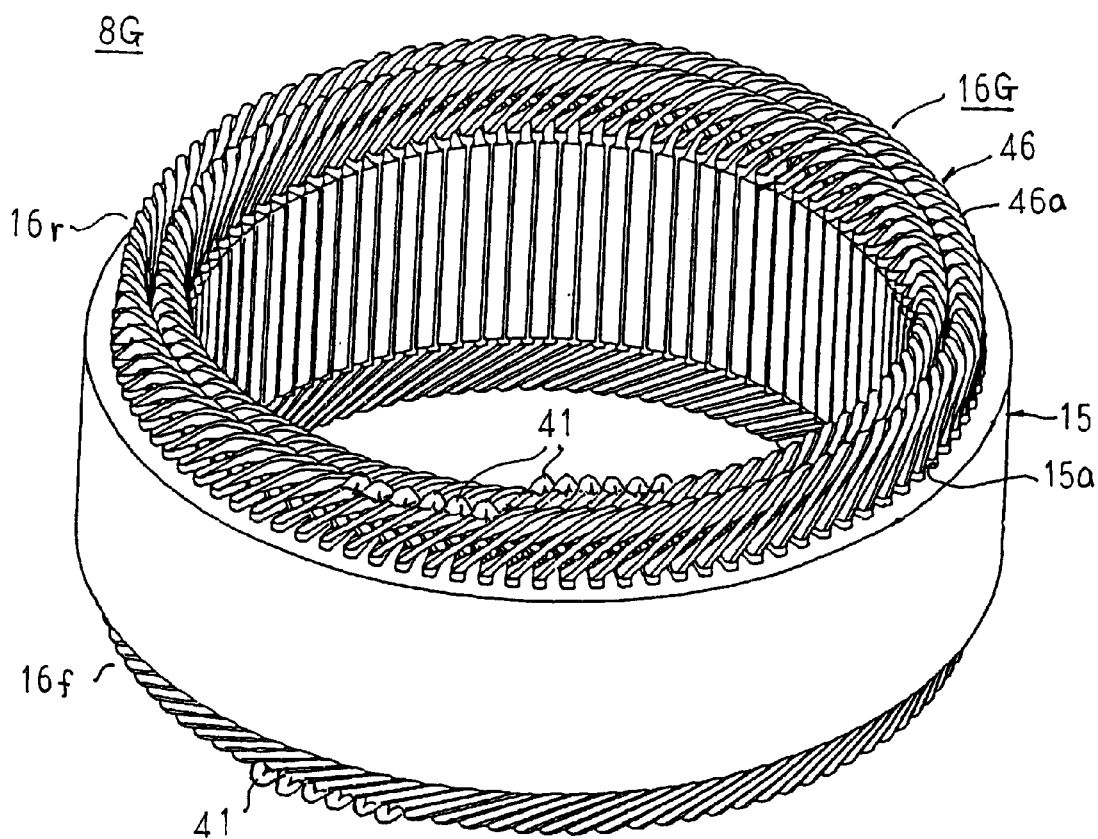
FIG. 13 is a perspective view showing a stator of an automotive alternator according to a ninth embodiment of the present invention.

FIG. 13 is a perspective view showing a stator of an automotive alternator according to the ninth embodiment of the present invention.

Referring to FIG. 13, in a stator 8G, a strand of wire 46 composed of a continuous copper wire that is covered with an insulating film and has a rectangular cross section is wavily wound into every sixth slot (one magnetic pole pitch) so as to alternating occupy a first address and a second address inside the slots 15a. The end portions of the strand of wire 46 are joined by welding to make up a first one-turn, wave-wound winding. Furthermore, a strand of wire 46 is wavily wound into every sixth slot so as to alternating occupy the second address and the first address inside the slots 15a, then the end portions of the strand of wire 46 are joined by welding to make up a second one-turn, wave-wound winding. Similarly, a strand of wire 46 is wavily wound into every sixth slot so as to alternating occupy a third address and a fourth address inside the slots 15a, then the end portions of the strand of wire 46 are joined by welding to make up a third one-turn, wave-wound winding. Furthermore, a strand of wire 46 is wavily wound into every sixth slot so as to alternating occupy the fourth address and the third address inside the slots 15a, then the end portions of the strand of wire 46 are joined by welding to make up a fourth one-turn, wave-wound winding.

The first through fourth wave-wound windings fabricated as described above are joined in series to constitute a four-turn stator winding phase group for one phase.

In the similar manner, the stator winding phase groups for six phases are fabricated by shifting the slots 15a, in which the strand of wire 46 is inserted, by one slot.

The stator winding groups for three phases are connected by, for example, the star connection, to make up a stator winding 16G formed of two three-phase AC windings. These two three-phase AC windings are respectively connected to rectifiers 12, so that the DC outputs of the rectifiers 12 are connected in parallel and combined.

In this embodiment, the second wave-wound winding is inversely wound and offset by an electrical angle of 180 degreesrelative to the first wave-wound winding. Similarly, the fourth wave-wound winding is inversely wound and offset by an electrical angle of 180 degreesrelative to the third wave-wound winding. On an end surface of the stator iron core 15, turn portions 46a of the strand of wire 46, which extends out from the first address of the first slot 15a, turns over outside the slot, and enters at the second address of the second slot 15a, which is six slots away from the first slot, are arranged in one row in the circumferential direction, thus making up a coil-end group in an inner peripheral side. Furthermore, on the end surface of the stator iron core 15, the turn portions 46a of the strand of wire 46, which extends out from the third address of the first slot 15a, turns over outside the slot, and enters at the fourth address of the second slot 15a, which is six slots away from the first slot, are arranged in one row in the circumferential direction, thus making up a coil-end group on an outer peripheral side.

Figure 14:
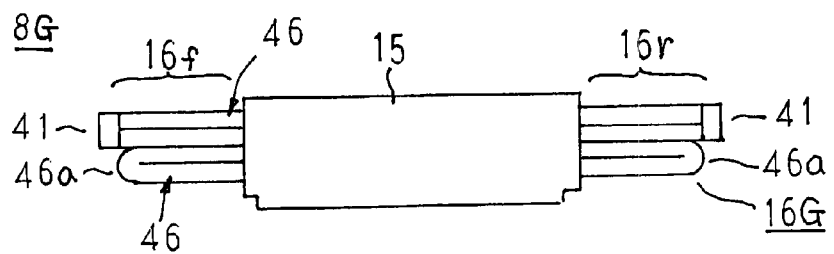
FIG. 14 is a simplified view showing coil-end groups in the stator of the automotive alternator according to the ninth embodiment of the present invention.
Figure 15:
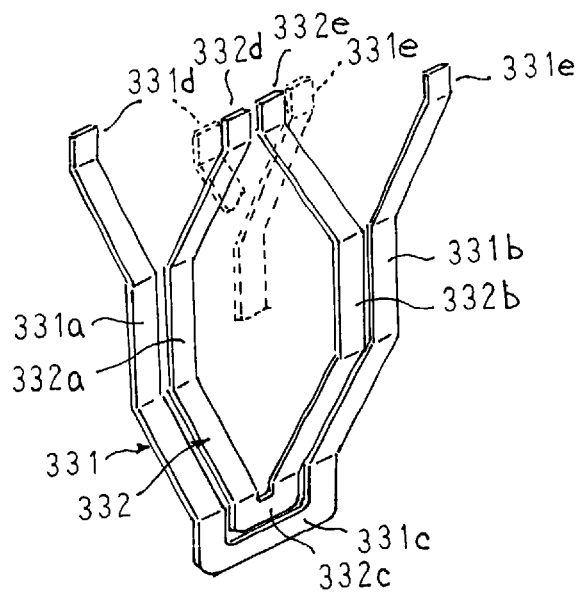
FIG. 15 is a schematic perspective view showing conductor segments constituting a stator winding in a conventional stator of an automotive alternator.
Figure 16:
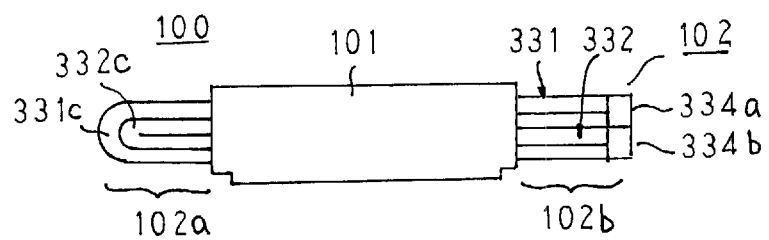
FIG. 16 is a simplified view showing coil-end groups in the conventional stator of the automotive alternator.
Figure 17:
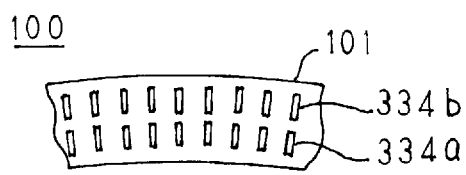
FIG. 17 is a simplified view illustrating the layout of joint portions of the coil-end groups in the conventional stator of the automotive alternator.
Figure 18:
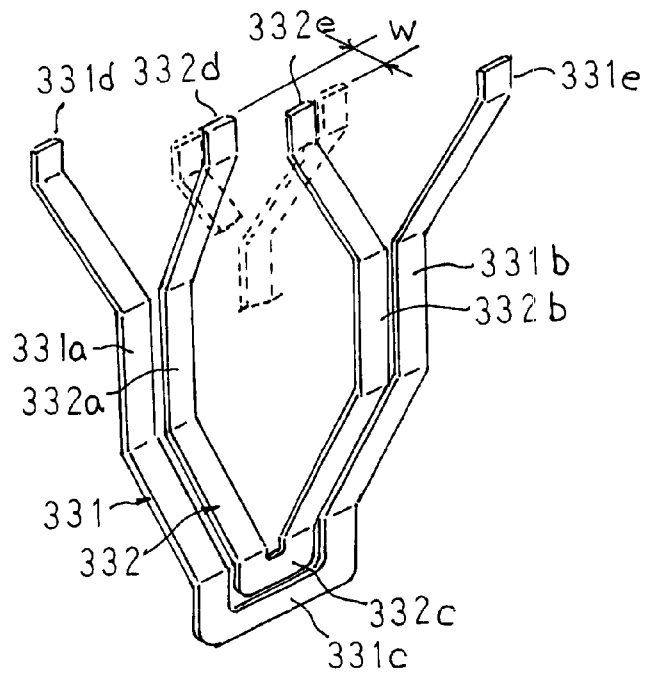
FIG. 18 is a schematic perspective view showing conductor segments constituting a stator winding in another conventional stator of an automotive alternator.
Figure 19:
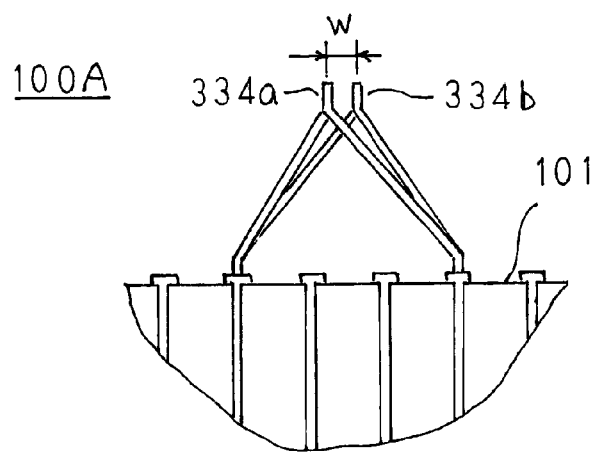
FIG. 19 is a partial development side view showing another conventional stator of the automotive alternator, observed from inner diameter side.
Figure 20:
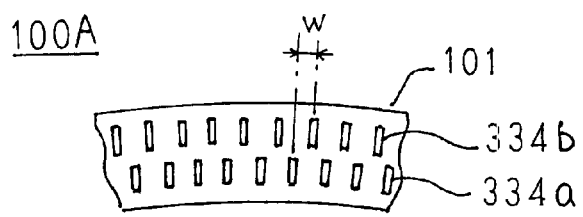
FIG. 20 is a simplified view illustrating the layout of joint portions of the coil-end group in another conventional stator of the automotive alternator.
Figure 21:
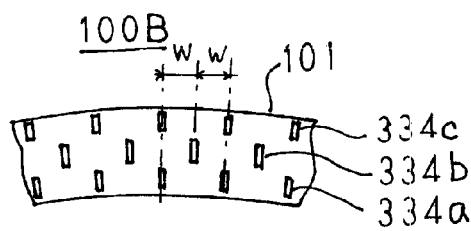
FIG. 21 is a simplified view illustrating the layout of joint portions of the coil-end group in yet another conventional stator of an automotive alternator.
Figure 22:
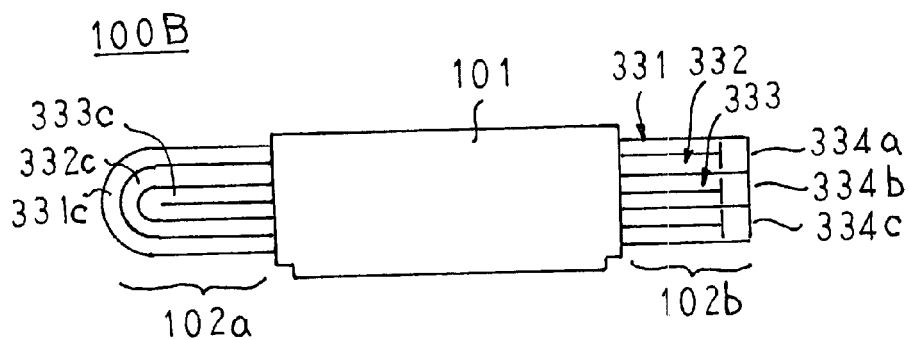
FIG. 22 is a simplified view illustrating coil-end groups in yet another conventional stator of the automotive alternator.

In the stator 8G, the turn portions 46a are adjacently stacked in two layers in a single radial row, being disposed in two rows in the circumferential direction to constitute coil-end groups 16f and 16r. In the joint portion 41 of the end portions of the strand of wire 46 constituting the first through fourth wave-wound windings, the joint portions 41 and the turn portions 46a are adjacently arranged in two layers aligned in a single row in the radial direction, being disposed in two rows in the circumferential direction, as shown in FIG. 13 and FIG. 14. The axial height of the joint portions 41 is greater than the axial height of the turn portions 46a.

Accordingly, in the ninth embodiment also, the joint portions 41, which have lost an insulating film due to welding, are adjacent to the turn portions 46a, which have the insulating film, in the radial direction. This arrangement suppresses short-circuiting for which the joint portions 41 are responsible, allowing good insulating properties to be accomplished.

Moreover, since the axial height of the joint portions 41 is greater than the axial height of the turn portions 46a adjacent thereto in the radial direction, welding efficiency can be improved, and short-circuiting from the joint portions 41 can be suppressed because the joint portions 41 are spaced apart from the turn portions 46a. The result is good insulating properties.

In addition, since each of the wave-wound windings of the stator winding phase group for each phase of the stator winding 16G is composed of a single wire 46, the number of joint portions is markedly reduced as compared with the cases where the U-shaped conductor segments are used as the strands of wire. With this arrangement, the welding efficiency will be significantly improved, and short-circuiting from the joint portions or other types of failure, including disconnection of welded spots, will be suppressed.

In the embodiments described above, the copper constituent having the rectangular cross section is employed as the strand of wire. The strand of wire, however, is not limited to the copper constituent having the rectangular cross section. For example, a copper constituent having a circular cross section may be used instead, in which case, the formability of the strand of wire will be improved, and the strand of wire can be disposed and connected more easily, leading to improved workability. Although the embodiments have used the copper constituent as the strand of wire, the strand of wire is not limited to the copper constituent; an aluminum constituent, for example, may be used instead.

Furthermore, in the embodiments set forth above, the present invention has been applied to the stator of an automotive alternator. The same advantages, however, will be obtained even if the present invention is applied to other types of alternators or motors.

The features of the present invention described above provided the following advantages.

The stator of a dynamo-electric machine in accordance with the present invention includes a stator iron core provided with a plurality of slots arranged in a circumferential direction, and a stator winding constructed by joining a plurality of strands of wire installed in the slots, which are spaced apart from each other by a predetermined number of slots, on an end surface of the stator iron core, wherein both coil-end groups of the stator winding are constructed by the joint portions interconnecting the strands of wire on the end surface of the stator iron core and turn portions of the strands of wire that extend out of one slot and enter another slot, the slots being spaced apart by a predetermined number of slots, on the end surface of the stator iron core, and on at least one coil-end group of the stator winding, the joint portions are disposed adjacently to the turn portions in the radial direction. With this arrangement, deterioration of insulating properties attributable to the joint portions can be suppressed, making it possible to provide a stator of a dynamo-electric machine exhibiting good insulating properties.

The stator of a dynamo-electric machine in accordance with the present invention includes a stator iron core provided with a plurality of slots arranged in a circumferential direction, and a stator winding constructed by joining a plurality of strands of wire installed in slots spaced apart by a predetermined number of slots on an end surface of the stator iron core, wherein both coil-end groups of the stator winding are constructed by the joint portions interconnecting the strands of wire on the end surface of the stator iron core and turn portions of the strands of wire that extend out of one slot and enter another slot, the slots being spaced apart from each other by a predetermined number of slots, on the end surface of the stator iron core, and on at least one coil-end group of the stator winding, the joint portions are disposed adjacently to the turn portions or other joint portions in the radial direction, and the axial height of the joint portions and the axial height of the turn portions adjacent to the joint portions in the radial direction or other joint portions are different. With this arrangement, deterioration of insulating properties attributable to the joint portions can be suppressed, making it possible to provide a stator of a dynamo-electric machine exhibiting good insulating properties and permitting improved welding efficiency.

On at least one coil-end group of the stator winding, the joint portions, or the joint portions and the turn portions may be arranged in three or more layers aligned in a single row in the radial direction. This arrangement allows a stator of a multi-layer coil end configuration to be accomplished.

On at least one coil-end group of the stator winding, the turn portions may be positioned adjacently to the joint portions at an inner radial side and an outer radial side of the joint portions and arranged in three layers aligned in a single row in the radial direction, and the axial height of the joint portions may be greater than the axial height of the turn portions. With this arrangement, the welding efficiency can be improved, and the deterioration of insulating properties attributable to the joint portions can be suppressed.

An insulating resin may be provided to cover the joint portions; hence, the deterioration of insulating properties attributable to joint portions can be suppressed, and the occurrence of disconnection of welded joint portions can also be suppressed.

The insulating resin may be provided between the joint portions adjoining in the radial direction and between the joint portions and the turn portions adjoining in the radial direction. This arrangement ensures uniform temperature distribution of a coil-end group.

Varnish may be applied to the coil-end groups; hence, the joint portions are covered with varnish, suppressing the deterioration of insulating properties attributable to the joint portions.

On at least one coil-end group, the turn portion may be located at an outermost radial position. With this arrangement, when the stator is mounted on a dynamo-electric machine, the corrosion of joint portions caused by leakage current due to short-circuiting between the joint portions and brackets can be suppressed.

The joint portion located at an outermost radial position may be formed to have a lower axial height than the joint portion or the turn portion that is adjacent thereto in the radial direction. Therefore, when the stator is mounted on a dynamo-electric machine, short-circuiting between the joint portion located at the outermost radial position and a bracket can be suppressed.

What is claimed is:

1. A stator of a dynamo-electric machine, comprising:
   a stator iron core provided with a plurality of slots arranged in a circumferential direction; and
   a stator winding constructed by joining a plurality of strands of wire installed in the slots, which are spaced away from each other by a predetermined number of slots, on an end surface of the stator iron core,
   wherein at least one coil-end group of the stator winding is constructed by the joint portions interconnecting the strands of wire on the end surface of the stator iron core and turn portions of the strands of wire that extend out of one slot and enter another slot, the slots being spaced away from each other by a predetermined number of slots, on the end surface of the stator iron core, and
   on at least one coil-end group of the stator winding, the joint portions are disposed adjacently to the turn portions in the radial direction.

2. The stator of the dynamo-electric machine according to claim 1, wherein on at least one coil-end group of the stator winding, the joint portions, or the joint portions and the turn portions are arranged in three or more layers in a single row in the radial direction.

3. The stator of the dynamo-electric machine according to claim 2, wherein on at least one coil-end group of the stator winding, the turn portions are positioned adjacently to the joint portions at an inner radial side and an outer radial side of the joint portions and arranged in three layers in a single row in the radial direction, and the axial height of the joint portions is greater than the axial height of the turn portions.

4. The stator of the dynamo-electric machine according to claim 1, wherein an insulating resin is provided to cover the joint portions.

5. The stator of the dynamo-electric machine according to claim 4, wherein the insulating resin is provided between the joint portions adjoining in the radial direction and between the joint portions and the turn portions adjoining in the radial direction.

6. The stator of the dynamo-electric machine according to claim 1, wherein varnish is applied to the coil-end groups.

7. The stator of the dynamo-electric machine according to claim 1, wherein on at least one coil-end group, the turn portion is located at an outermost radial position in the radial direction.

8. The stator of the dynamo-electric machine according to claim 1, wherein the joint portion located at an outermost radial position is formed to have a lower axial height than the joint portion or the turn portion that is adjacent thereto in the radial direction.

9. A stator of a dynamo-electric machine comprising:

a stator iron core provided with a plurality of slots arranged in a circumferential direction; and a stator winding constructed by joining a plurality of strands of wire installed in slots, which are spaced apart from each other by a predetermined number of slots, on an end surface of the stator iron core, wherein at least one coil-end group of the stator winding is constructed by the joint portions interconnecting the strands of wire on the end surface of the stator iron core and turn portions of the strands of wire that extend out of one slot and enter another slot, the slots being spaced apart from each other by a predetermined number of slots, on the end surface of the stator iron core, and on at least one coil-end group of the stator winding, the joint portions are disposed adjacently to the turn portions or other joint portions in the radial direction, and the axial height of the joint portions and the axial height of the turn portions or other joint portions adjacent to the joint portions in the radial direction are different.

10. The stator of the dynamo-electric machine according to claim 9, wherein on at least one coil-end group of the stator winding, the joint portions, or the joint portions and the turn portions are arranged in three or more layers in a single row in the radial direction.

11. The stator of the dynamo-electric machine according to claim 10, wherein on at least one coil-end group of the stator winding, the turn portions are positioned adjacently to the joint portions at an inner radial side and an outer radial side of the joint portions and arranged in three layers in a single row in the radial direction, and the axial height of the joint portions is greater than the axial height of the turn portions.

12. The stator of the dynamo-electric machine according to claim 9, wherein an insulating resin is provided to cover the joint portions.

13. The stator of the dynamo-electric machine according to claim 12, wherein the insulating resin is provided between the joint portions adjoining in the radial direction and between the joint portions and the turn portions adjoining in the radial direction.

14. The stator of the dynamo-electric machine according to claim 9, wherein varnish is applied to the coil-end groups.

15. The stator of the dynamo-electric machine according to claim 9, wherein on at least one coil-end group, the turn portion is located at an outermost radial position in the radial direction.

16. The stator of the dynamo-electric machine according to claim 9, wherein the joint portion located at an outermost radial position is formed to have a lower axial height than the joint portion or the turn portion that is adjacent thereto in the radial direction.

* * * * *